US006615474B2

(12) United States Patent
Ramirez

(10) Patent No.: US 6,615,474 B2
(45) Date of Patent: Sep. 9, 2003

(54) SINK FLANGE ASSEMBLY INSTALLATION METHOD AND TOOL

(76) Inventor: Albert F. Ramirez, 5171 Red Oak Dr., Riverside, CA (US) 92509

(*) Notice: Subject to any disclaimer, the term of this patent is extended or adjusted under 35 U.S.C. 154(b) by 0 days.

(21) Appl. No.: 09/961,851

(22) Filed: Sep. 24, 2001

(65) Prior Publication Data

US 2002/0138963 A1 Oct. 3, 2002

Related U.S. Application Data

(60) Provisional application No. 60/281,084, filed on Apr. 2, 2001.

(51) Int. Cl.[7] ............................ B23P 11/02; B25B 7/02

(52) U.S. Cl. ............................ 29/450; 29/229; 29/268; 81/302; 81/422; 81/424

(58) Field of Search .......................... 29/450, 225, 229, 29/268; 81/302, 422, 424

(56) References Cited

U.S. PATENT DOCUMENTS

| | | | | | |
|---|---|---|---|---|---|
| 387,226 | A | | 8/1888 | Gleich et al. | |
| 1,219,160 | A | * | 3/1917 | Rosenblatt | 81/302 |
| 2,716,273 | A | | 8/1955 | Woodruff et al. | |
| 3,050,841 | A | * | 8/1962 | Esselstyn | 29/268 |
| 3,619,890 | A | | 11/1971 | Kubokawa | |
| 4,106,374 | A | * | 8/1978 | Dragan | 81/302 |
| 4,907,477 | A | * | 3/1990 | Farber | 81/302 |
| 5,023,989 | A | | 6/1991 | Hargrave | |
| 5,212,859 | A | | 5/1993 | Hagerty | |
| 5,311,798 | A | | 5/1994 | Trusky | |
| 5,515,587 | A | | 5/1996 | Pool | |
| 5,584,110 | A | * | 12/1996 | Mordoch | 29/229 |
| 5,833,290 | A | * | 11/1998 | Curelop et al. | 29/268 |
| 6,145,417 | A | | 11/2000 | Bates et al. | |
| 6,360,419 | B1 | * | 3/2002 | Newcomer | 29/229 |
| 6,477,756 | B2 | * | 11/2002 | Newcomer | 29/229 |

OTHER PUBLICATIONS

Installation instructions for IN SINK ERATOR food waste diposer; Emerson Electric Co. of Racine, Wisconsin; published more than one year prior to the filing date of the instant application.

* cited by examiner

*Primary Examiner*—David P. Bryant
(74) *Attorney, Agent, or Firm*—Buhler & Associates; Kirk A. Buhler

(57) ABSTRACT

A tool for installing a locking ring in an annular groove defined by a lower annular rim portion of a sink flange (e.g., a component of a garbage disposer sink flange assembly) includes a pair of first and second elongated members that are pivotally connected at a pivot point to form a pair of opposed first and second handles and a pair of opposed ring-engaging first and second tips. The first and second tips define a pair of outwardly facing first and second indentations that adapt the first and second tips to engaging the locking ring in order to spread the locking ring by operation of the person squeezing the first and second handles toward each other. The first and second tips define a pair of inwardly facing third and fourth indentations that adapt the first and second tips to engaging the annular rim portion of the sink flange. In addition, the first and second elongated members includes a pair of first and second ring-dislodging components or dislodgers that enable the person to dislodge the locking ring from the first and second tips in order to complete installation of the locking ring in the annular groove. A method of installing the locking ring includes providing a tool as described above, engaging and spreading the locking ring with the first and second tips of the tool by squeezing the handles toward each other, moving the tool to a position such that the locking ring surrounds the groove and the first and second tips engage the lower rim portion of the sink flange, and operating the dislodging components to complete placement of the locking ring in the groove.

7 Claims, 4 Drawing Sheets

SINK FLANGE ASSEMBLY INSTALLATION METHOD AND TOOL

This application claims the benefit of copending U.S. Provisional Application Ser. No. 60/281,084 filed Apr. 2, 2001.

BACKGROUND OF THE INVENTION

1. Technical Field

This invention relates generally to home construction equipment and tools, and more particularly to a method and tool for installing a sink flange assembly of the type having a locking ring component that fits in an annular groove on a sink flange component (e.g., a typical garbage disposer sink flange assembly).

2. Description of Related Art

The term "garbage disposer sink flange assembly" refers to an assembly that fits in the drain hole of a sink for use in mounting a food waste disposer unit (i.e., a garbage disposer) just beneath the sink. Regardless of the particular type and kind, the garbage disposer sink flange assembly serves as means to provide a water-tight mounting on the sink for the garbage disposer. Installation requires some skill as the installer operates above and under the sink to install the sink flange. As he does so, certain problems arise.

To visualize some of the problems, consider the installation of a typical commercially available sink flange assembly that includes a sink flange, a fiber gasket, a backup ring, a mounting ring, and a snap ring (i.e., a locking ring). In compliance with the installation instructions supplied with the sink flange assembly, the installer first works above the sink to apply plumber's putty on the upper side of the sink around the drain hole. Next, he inserts the sink flange into the sink hole, pressing down on it slowly and firmly so that it seats evenly on the plumber's putty. Then, he moves to a position beneath the sink to mount the other components on the lower portion of the sink flange extending through the sink hole.

From his position beneath the sink, he positions the fiber gasket on the lower portion of the sink flange, followed by the backup ring and then the mounting ring. Holding those components tightly against the underside of the sink, he slides the locking ring onto the lower portion of the sink flange until the locking ring pops or snaps into an annular groove defined by the lower portion of the sink flange. Once that is accomplished, he tightens three screws on the mounting ring that bear upwardly against the backup ring. That forces the mounting ring downwardly against the locking ring, and that pulls the sink flange down tightly against the plumber's putty on the upper side of the sink.

In doing this, various problems arise. First, the sink flange tends to move upwardly when any upward pressure is applied to it, and that dislodges the sink flange from its seated position on the plumber's putty. To overcome that problem, another person can help from a position above the sink by pressing downwardly on the sink flange while the installer completes the installation beneath the sink. Alternatively, as the instructions provide, a weighted object can be placed in the sink atop the sink flange to hold the sink flange in place, using a towel under the object to prevent scratching of the sink. Either way involves more time and One commonly used method of installing the locking ring uses screwdrivers to wedge against and spread the locking ring while pushing upwardly. Many missed attempts often result, jarring the sink flange all the more. Another method of installing the locking ring attempts to spread the locking ring by hand while pushing it upwardly, risking finger and thumb cuts on the sharp edge of the sink flange. In other words, existing procedures are time consuming and frustrating and they risk injury. These methods also present the hazard of the backup ring and the mounting ring falling down on the installer's face or head while he is working below the sink. Thus, a need exists for a better way to install a sink flange assembly.

SUMMARY OF THE INVENTION

This invention addresses the concerns outlined above by providing a facilitating method and tool for installing a locking ring on the sink flange component of a sink flange assembly. The tool is used to engage the locking ring, to spread the locking ring, and to place the locking ring in the groove without disrupting the sink flange seating. Doing so according to the present invention avoids the need for two people or for a heavy weight on the sink flange. Installation proceeds quickly and efficiently without lost time, and it avoids injury to the fingers and thumb of the installer.

To paraphrase some of the more precise language appearing in the claims, a method for installing a locking ring in an annular groove defined by a lower annular rim portion of a sink flange includes the step of providing a ring-engaging-and-expanding tool. The tool has a pair of opposed first and second handles and a pair of opposed ring-engaging first and second tips such that the first and second tips are adapted to engage the locking ring in order to spread the locking ring by operation of the person squeezing the first and second handles toward each other. The first and second tips are also adapted to engage the annular rim portion of the sink flange, and the tool includes a pair of first and second ring-dislodging components that are adapted to enable the person to dislodge the locking ring from the first and second tips by operation of the ring-dislodging components. The method proceeds by (i) engaging and spreading the locking ring with the first and second tips of the tool by squeezing the handles toward each other (ii) moving the tool to a position such that the locking ring circumscribes (i.e., surrounds) the groove and the first and second tips engage the lower rim portion of the sink flange; and (iii) operating the dislodging components to complete placement of the locking ring in the groove.

In line with the foregoing method, a tool constructed according to the invention for installing a locking ring in an annular groove defined by a lower annular rim portion of a sink flange (e.g., a sink flange component of a garbage disposer sink flange assembly) includes a pair of first and second elongated members that are pivotally connected to each other at a pivot point to form a pair of opposed first and second handles and a pair of opposed ring-engaging first and second tips. The first and second tips move away from each other by operation of a person squeezing the first and second handles toward each other. Each of the first and second tips defines a respective one of a pair of outwardly facing first and second indentations that adapt the first and second tips to function as means for engaging the locking ring in order to spread the locking ring by operation of the person squeezing the first and second handles toward each other. Each of the first and second tips also defines a respective one of a pair of inwardly facing third and fourth indentations that adapt the first and second tips to function as means for engaging the annular rim portion of the sink flange. In addition, each of the first and second elongated members includes a respective one of a pair of first and second ring-dislodging components or dislodgers that function as means for enabling the person to dislodge the locking ring from the first and second tips in order to complete installation of the locking ring in the annular groove.

Thus, the invention provides a sink flange assembly installation method and tool that significantly facilitate installation. The following illustrative drawings and detailed description make the foregoing and other objects, features, and advantages of the invention more apparent.

DESCRIPTION OF THE PREFERRED EMBODIMENTS

Figure 1:
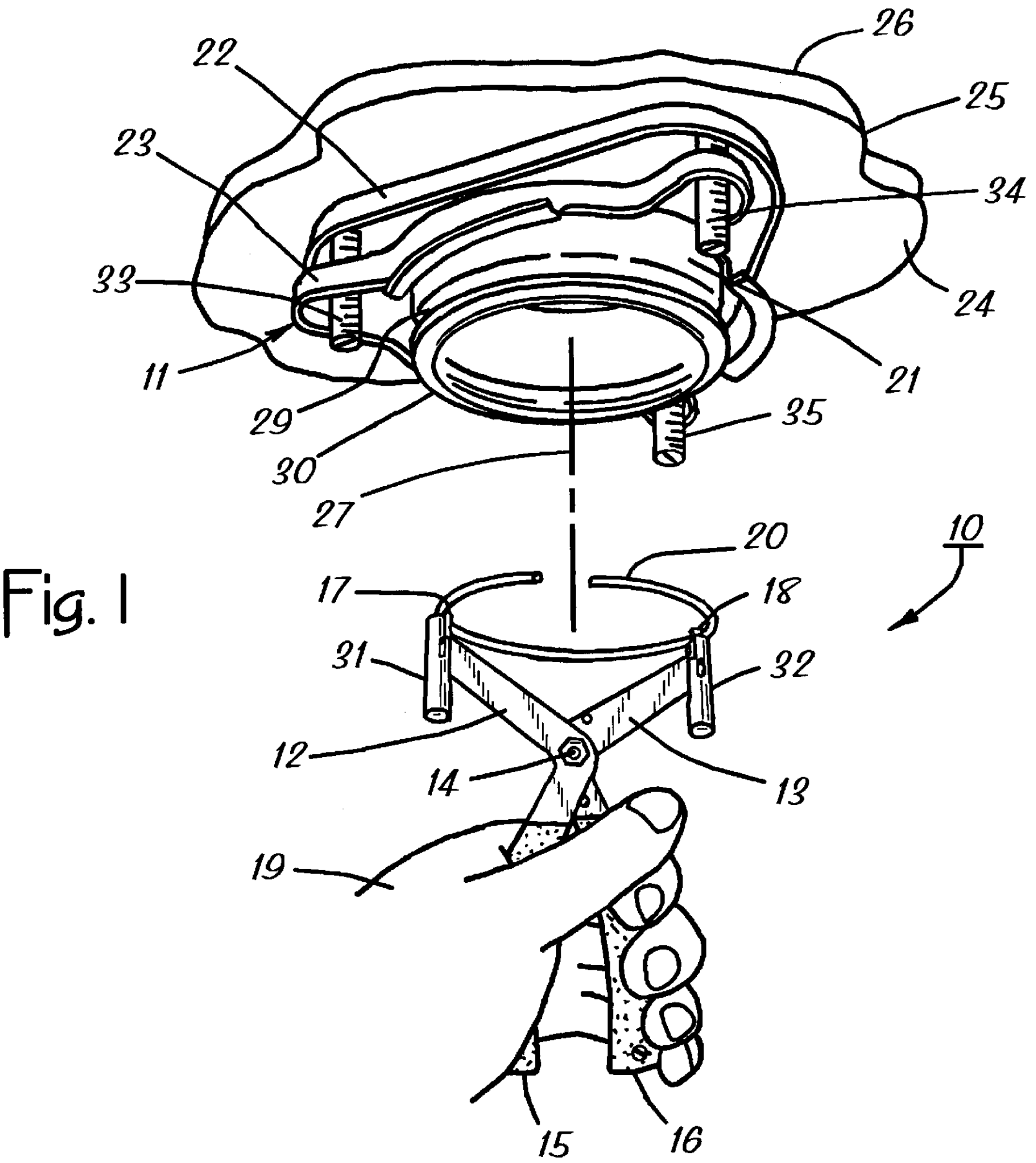
FIG. 1 of the drawings is an isometric view of a tool constructed according to the invention, shown in use by an installer as the tool engages and expands a locking ring in order to facilitate installation of the expanded locking ring on an existing sink flange assembly.

FIGS. 1–7 of the drawings show various aspects of a method and tool 10 for installing a garbage disposer sink flange assembly 11 according to the invention. Generally, a tool constructed according to the invention includes a pair of first and second elongated members that are pivotally connected to each other at a pivot point to form a pair of opposed first and second handles and a pair of opposed ring-engaging first and second tips such that the first and second tips move away from each other by operation of a person squeezing the first and second handles toward each other. Thus, the tool 10 includes a pair of first and second elongated members 12 and 13 (FIGS. 1 and 3) that are pivotally connected to each other at a pivot point 14 (i.e., a pivotal axis that is generally perpendicular to the page on which FIG. 3 appears) to form a pair of opposed first and second handles 15 and 16 (the proximal end portions of the elongated members), and a pair of opposed ring-engaging first and second tips 17 and 18 (the distal end portions of the elongated members).

The elongated members 12 and 13 are fabricated from a suitably strong rigid material (e.g., 1/16-inch thick steel) and they are connected together pivotally so that the first and second tips 17 and 18 move away from each other by operation of a person 19 (FIG. 1) squeezing the first and second handles 15 and 16 sufficiently to cause them to move toward each other. The person 19 does that to engage and spread a locking ring 20 for purposes of installing the locking ring 20 with other components of a garbage disposer sink flange assembly 11 shown in FIG. 1.

The sink flange assembly 11 represents any of various types and kinds of sink flange assemblies. It includes a sink flange 21 (e.g., a metal component having a 3.375-inch outside diameter), a backup ring 22, a mounting ring 23, and the locking ring 20 (e.g., 0.125-inch diameter spring steel wire forming a 3.25-inch diameter inside diameter ring when not expanded). The sink flange assembly 11 usually includes a gasket also for mounting between the backup ring 22 and an underside 24 of a sink 25 (FIGS. 1 and 2), but that component is not really necessary for an understanding of the present invention and so a gasket has not been illustrated.

With the sink flange 21 extending downwardly from an upper side 26 of the sink 25, along a vertically extending central axis of symmetry 27 of the sink flange 21, and through a sink drain hole 28 (FIG. 2) in the sink 25, the person 19 places the backup ring 22 and the mounting ring 23 over the sink flange 21 to partially assemble those components (FIG. 1). Next, he uses a ring-engaging-and-expanding tool (e.g., the tool 10) to place the locking ring 20 in an annular groove 29 defined by a lower annular rim portion 30 of the sink flange 21. The tool 10 is shown expanding the locking ring 20 in FIG. 1 by operation of the person 19 squeezing the handles 15 and 16 toward each other. He expands the diameter of the locking ring 20 sufficiently to fit over the lower annular rim portion 30. After placing the locking ring 20 in the annular groove 29, the person 19 operates first and second ring-dislodging components in the form of a pair of dislodgers 31 and 32 on the first and second tips 17 and 18 of the tool 10 to dislodge the locking ring 20 from the first and second tips 17 and 18, and then he tightens three screws 33, 34, and 35 on the mounting ring 23 to complete the installation.

Figure 2:
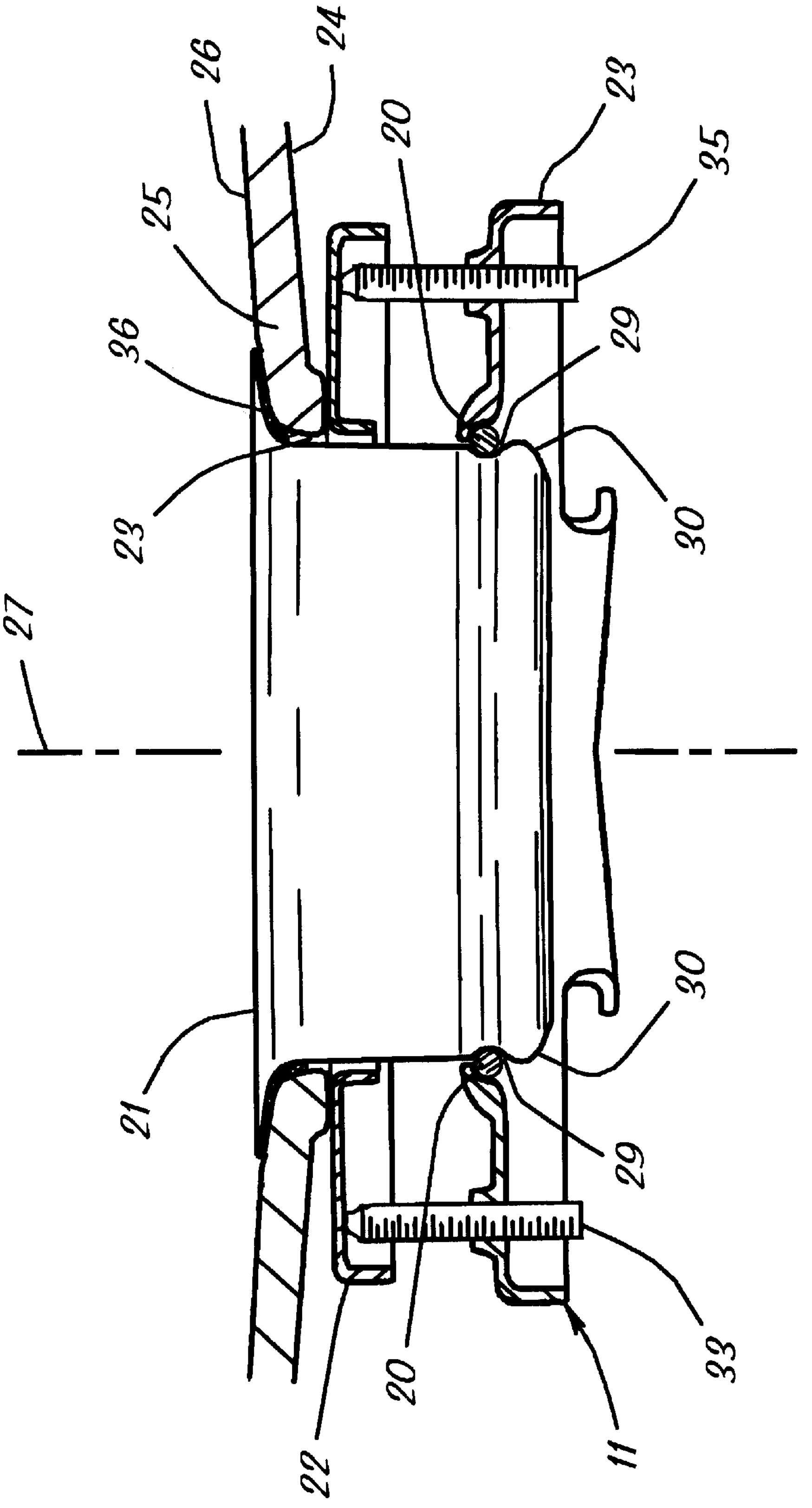
FIG. 2 is an enlarged cross section view of the installed sink flange assembly as viewed in a vertical plane containing the central axis of symmetry of the assembly, showing the completed assembly after placement of the locking ring and tightening of the screws on the mounting ring against the backup ring.

The use of a ring-engaging-and-expanding tool significantly facilitates installation without disrupting the sink flange 21 seating on the plumber's putty that is identified by reference numeral 36 in FIG. 2. The use of a ring-engaging-and-expanding tool avoids the need for two people or for a heavy weight on the sink flange 21. Installation proceeds quickly and efficiently without lost time while avoiding injury to the fingers and thumb of the person 19 and controlling the backup ring 22 and the mounting ring 23 from falling down on the person 19 or other installer.

Figure 5:
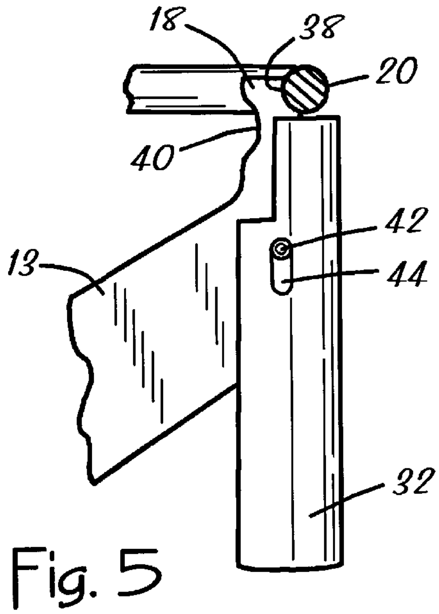
FIG. 5 is an enlarged elevation view similar to FIG. 4, after the locking ring is engaged by the tool tip.
Figure 6:
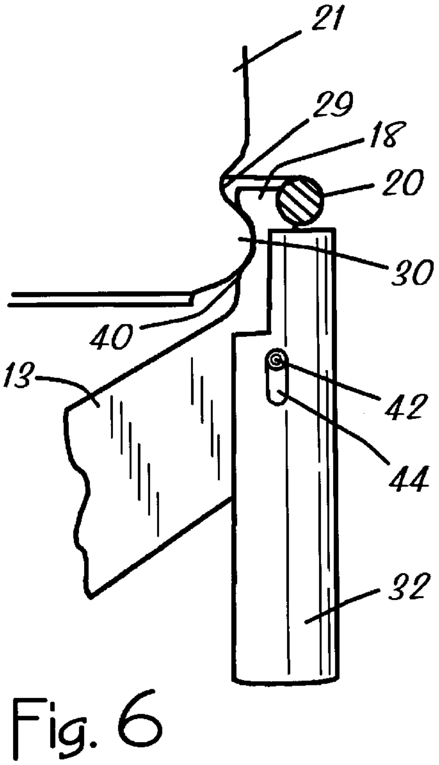
FIG. 6 is an enlarged elevation view similar to FIG. 4 showing placement of the expanded locking ring in the annular groove on the sink flange component of the sink flange assembly.

FIGS. 3–7 focus more on the tool 10. The first and second elongated members 12 and 13 and their first and second tips 17 and 18 are generally similar for reduced fabrication costs, the second one being flipped horizontally with respect to the first one (i.e., rotated 180 degrees about an axis of elongation) before being connected to the first one at the pivot point 14. Inasmuch as they are so similar, only the tip 18 is illustrated in FIGS. 4–7. Each one of the first and second tips of a tool constructed according to the invention defines a respective one of a pair of outwardly facing first and second indentations that adapt the first and second tips to function as means for engaging the locking ring in order to spread the locking ring by operation of the person squeezing the first and second handles toward each other. Accordingly, each one of the first and second tips 17 and 18 defines a respective one of a pair of outwardly facing first and second indentations 37 and 38 (FIGS. 3–7). They face radially outward with respect to the central axis of symmetry 27 in FIG. 1 when the tool is positioned as shown in FIG. 1, with the central axis of symmetry 27 passing through the pivot point 14 and thereby through the center of the locking ring 20 (not identified by a reference numeral). That adapts the first and second tips 17 and 18 to function as means for engaging the locking ring 20 in order to hold and spread the locking ring 20 by operation of the person 19 or other installer squeezing the first and second handles 15 and 16 toward each other. They adapt the first and second tips 17 and 18 to that function in the sense that the first and second indentations 37 and 38 are sized to receive the cross sectional shape (e.g., circular) of the locking ring 20, as illustrated in FIGS. 5 and 6 for the second indentation 38, in order to thereby impede movement of the locking ring 20 relative to the first and second tips 17 and 18 during movement of the tool 10 and the locking ring 20 to the position shown in FIG. 6, a position in which the locking ring 20 surrounds the annular groove 29.

Each one of the first and second tips of a tool constructed according to the invention also defines a respective one of a pair of inwardly facing third and fourth indentations that adapt the first and second tips to function as means for engaging the annular rim portion of the sink flange. Accordingly, each one of the first and second tips 17 and 18 also defines a respective one of a pair of inwardly facing third and fourth indentations 39 and 40 (FIGS. 3–7). The third and fourth indentations 39 and 40 face radially inward with respect to the central axis of symmetry 27 in FIG. 1 when the tool is positioned as shown in FIG. 1. That adapts the first and second tips 17 and 18 to function as means for engaging the lower annular rim portion 30 of the sink flange 21.

The first and second tips 17 and 18 engage the lower annular rim portion 30, as illustrated in FIG. 6 for the fourth indentation 40, when the person 19 releases his squeeze on the handles 15 and 16 slightly. When he does that, the spring biasing action provided to the first and second elongated members 17 and 18 by the resiliently deformable locking ring 20 moves the tips 17 and 18 radially inward into engagement with the lower annular rim portion 30. In other words, the third and fourth indentations 39 and 40 adapt the first and second tips 17 and 18 to the stated function in the sense that the third and fourth indentations 39 and 40 are sized to receive the cross sectional shape of the lower annular rim portion 30 of the sink flange 21 as illustrated in order to thereby impede movement of the first and second tips 17 and 18 of the tool 10 (and the locking ring 20) relative to the lower annular rim portion 30.

In addition, each one of the first and second elongated members of a tool constructed according to the invention includes a respective one of a pair of first and second ring-dislodging components that are adapted to function as means for enabling the person to dislodge the locking ring from the first and second tips in order to complete installation of the locking ring in the annular groove. This is accomplished in the illustrated tool 10 with ring-dislodging components in the form of the first and second dislodgers 31 and 32 mentioned previously with reference to FIG. 1. The first and second dislodgers 31 and 32 are adapted to function as means for enabling the person 19 to dislodge the locking ring 20 from the first and second tips 17 and 18 in order to complete installation of the locking ring 20 in the annular groove 29.

Figure 7:
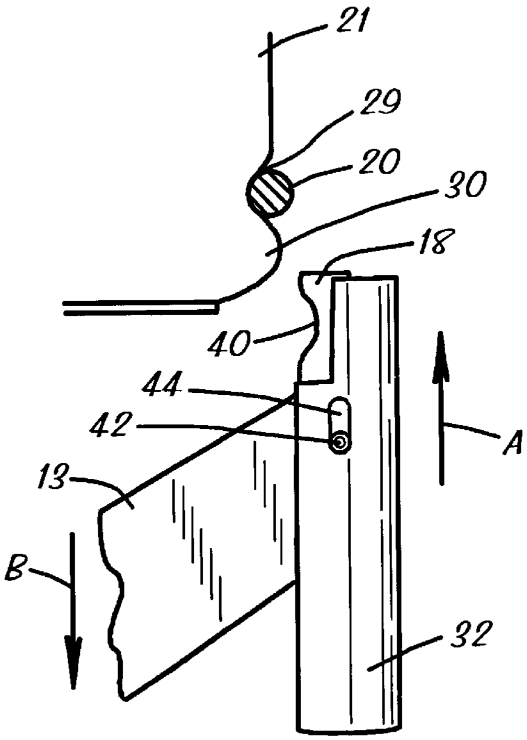
FIG. 7 is an enlarged elevation view similar to FIG. 4 showing the locking ring after it has been placed in the groove on the sink flange component by dislodging if from the tool tip by movement of the ring-dislodging component or dislodger toward the tip distally.

To dislodge the locking ring 20, the person 19 pushes each of the first and second dislodgers 31 and 32 upwardly toward a respective one of the first and second tips 17 and 18, as depicted by an arrow A in FIG. 7, and that causes them to push the locking ring 20 upwardly out of the first and second indentations 37 and 38. Once pushed upwardly out of the indentations 37 and 38, the locking ring 20 springs back toward its unexpanded size to thereby seat in the annular groove 29 as shown in FIG. 7. The locking ring 20 snaps in place in the groove 29 and the person 19 withdraws the tool 10 downwardly as depicted by an arrow B in FIG. 7.

Various forms of ring-dislodging components may be used to dislodge the locking ring 20. The illustrated first and second dislodgers 31 and 32 take the form of a 1.25-inch long cylindrically shaped plastic components. Each one may have a longitudinally extending slit into which a respective one of the first and second tips 17 and 18 fits. Each one of the first and second dislodgers 31 and 32 is mounted on a respective one of the first and second tips 17 and 18 so that the person 19 can pushed it from the withdrawn position (as shown for the dislodger 32 in FIGS. 1, and 3–6) to the deployed position (as shown for the dislodger 32 in FIG. 7). A pair of first and second pins 41 and 42 (FIGS. 3–7) protrude into a pair of first and second slots 43 and 44 to limit the travel of the first and second dislodgers 31 and 32 (e.g., to about one quarter inch).

Figure 3:
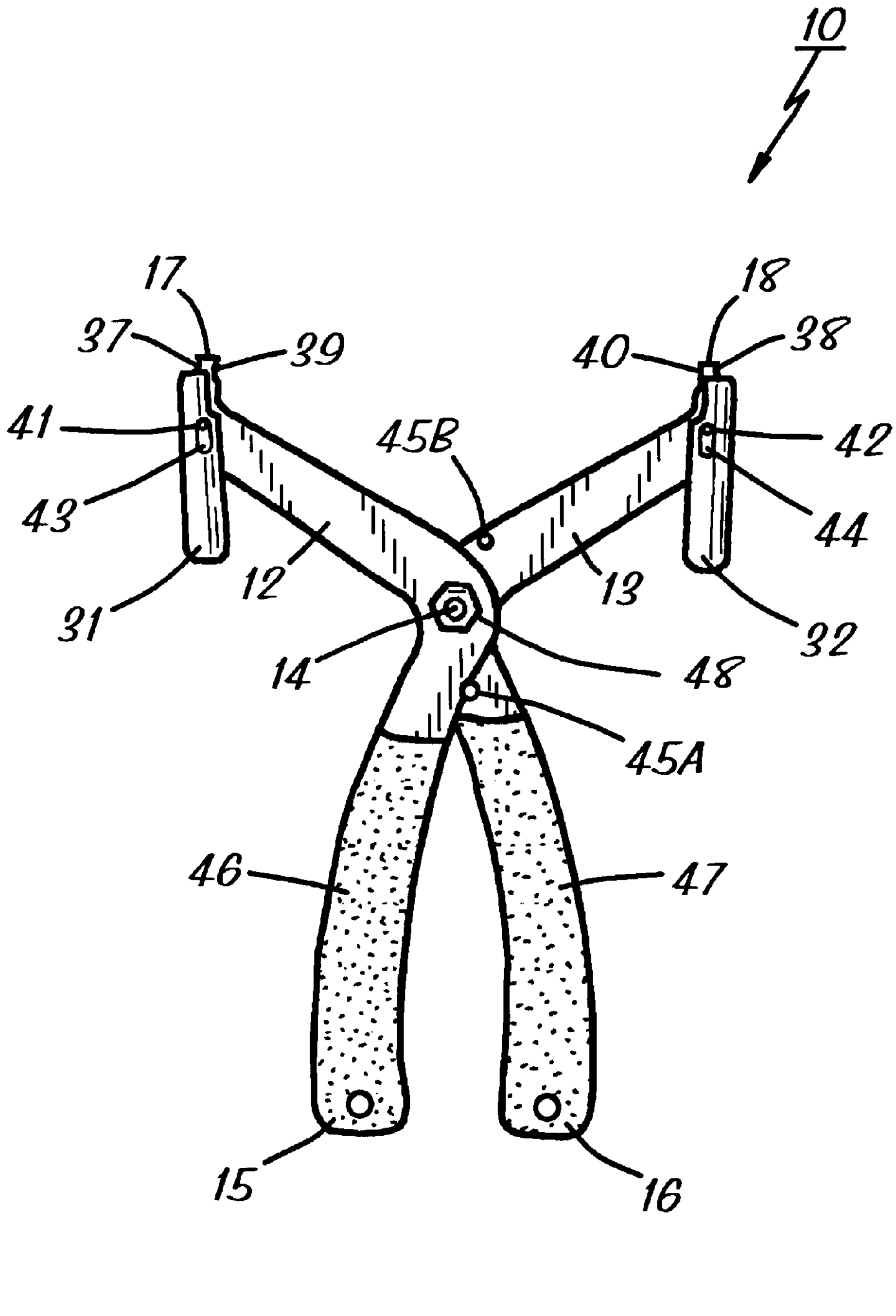
FIG. 3 is a plan view of just the ring-engaging-and-expanding tool.
Figure 4:
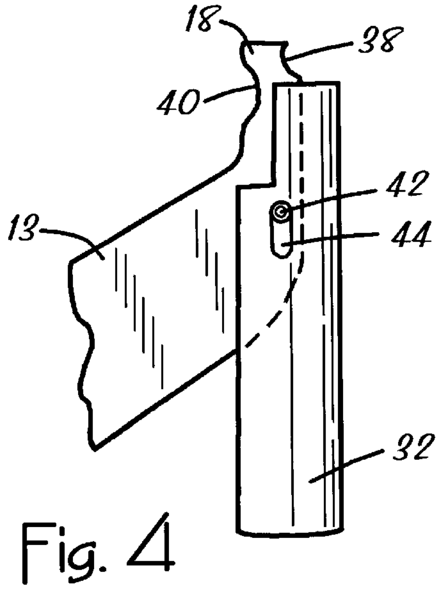
FIG. 4 is an enlarged elevation view of one of the tool tips, with the ring-dislodging component or dislodger in a withdrawn position.

As a further idea of size, the tool 10 measures about 5.75 inches long, with the first and second indentations 37 and 38 being spaced apart about 3.75 inches when the first and second handles 15 and 16 are squeezed together to the position illustrated in FIG. 3. First and second stop components 45A and 45B on the second elongated member 18 (FIG. 3) limit how far the first and second handles 15 and 16 can be moved toward and away from each other (i.e., the range of motion of the tool 10). The stop component functions as means for limiting the amount the person 19 can squeeze the first and second handles 15 and 16 toward each other. In addition to the foregoing, the first and second handles 15 and 16 include rubber coatings 46 and 47 for better gripping. A nut-and-bolt combination 48 or other suitable fastener connects the first and second elongated members together at the pivot point 14 (FIG. 3).

Thus, the tool 10 is adapted to work with the locking ring 20 of the sink flange assembly 11 for purposes of facilitating the installation of the locking ring 20. Recapitulating the methodology employed, a method for installing a locking ring (e.g., the locking ring 20) in an annular groove defined by a lower annular rim portion of a sink flange (e.g., the groove 29 in the sink flange 21) includes the step of providing a ring-engaging-and-expanding tool as described above (e.g., the tool 10). The method proceeds as illustrated by engaging and spreading the locking ring 20 with the first and second tips 17 and 18 of the tool 10 as depicted in FIG. 5. Next, the person 19 moves the tool 10 to a position such that the locking ring 20 surrounds the groove 29 and the first and second tips 17 and 18 engage the lower rim portion 30 of the sink flange 21 as depicted in FIG. 6. Then, the person 19 operates the first and second dislodgers 31 and 32 to dislodge the locking ring 20 from the tips 17 and 18 as depicted in FIG. 7 to complete placement of the locking ring 20 in the groove 29. After that, the person 19 tightens the screws 33–35 so that the mounting ring 23 bears downwardly against the locking ring 20. That action applies downward force to the locking ring 20 and the sink flange 21 in order to secure the sink flange 21 downwardly against the plumber's putty 36 on the upper side 26 of the sink 25 (FIG. 2).

The foregoing makes it apparent that the method and tool of the invention significantly facilitate locking ring installation without disrupting the sink flange. The use of a ring-engaging-and-expanding tool avoids the need for two people or for a heavy weight on the sink flange. Installation proceeds quickly and efficiently without lost time while avoiding injury to the fingers and thumb of the person 19 or other installer. Although exemplary procedures and an exemplary embodiment have been shown and described, one of ordinary skill in the art may make many changes, modifications, and substitutions without necessarily departing from the spirit and scope of the invention.

What is claimed is:

1. A method for installing a locking ring in an annular groove defined by a lower annular rim portion of a sink flange, the method comprising:

providing a tool having a pair of opposed first and second handles and a pair of opposed ring-engaging first and second tips such that the first and second tips are adapted to engage the locking ring in order to spread the locking ring by operation of the person squeezing the first and second handles toward each other, the first and second tips are adapted to engage the annular rim portion of the sink flange, and the tool includes a pair of first and second ring-dislodging components that are adapted to enable the person to dislodge the locking ring from the first and second tips by operation of the ring-dislodging components;

engaging and spreading the locking ring with the first and second tips of the tool by squeezing the handles toward each other;

moving the tool to a position such that the locking ring surrounds the groove and the first and second tips engage the lower rim portion of the sink flange; and operating the dislodging components to complete placement of the locking ring in the groove.

2. A tool for installing a locking ring in an annular groove defined by a lower annular rim portion of a sink flange, the tool comprising:

a pair of first and second elongated members that are pivotally connected to each other at a pivot point to form a pair of opposed first and second handles and a pair of opposed ring-engaging first and second tips such that the first and second tips move away from each other by operation of a person squeezing the first and second handles toward each other;

each of the first and second tips defining a respective one of a pair of outwardly facing first and second indentations that adapt the first and second tips to function as means for engaging the locking ring in order to spread the locking ring by operation of the person squeezing the first and second handles toward each other;

each of the first and second tips defining a respective one of a pair of inwardly facing third and fourth indentations that adapt the first and second tips to function as means for engaging the annular rim portion of the sink flange; and each of the first and second elongated members including a respective one of a pair of first and second ring-dislodging components that are adapted to function as means for enabling the person to dislodge the locking ring from the first and second tips in order to complete installation of the locking ring in the annular groove.

3. A tool as recited in claim 2, wherein each of the ring-dislodging components is attached slidably to a respective one of the first and second tips for movement between a withdrawn position and a deployed position.

4. A tool as recited in claim 2, wherein the first and second elongated members have a similar shape and the second elongated member is flipped horizontally with respect to the first elongated member before being connected to the first elongated member at the pivot point.

5. A tool as recited in claim 2, wherein the second elongated member includes means for limiting the amount the person can squeeze the first and second handles toward each other.

6. A tool as recited in claim 2, wherein the first and second handles include rubber coatings.

7. A tool for installing a locking ring in an annular groove defined by a lower annular rim portion of a sink flange, the tool comprising:

a pair of first and second elongated members that are pivotally connected to each other to form a pair of opposed first and second handles at proximal end portions of the first and second elongated members and a pair of opposed ring-engaging first and second tips at distal end portions of the first and second elongated members;

each of the first and second tips defining a respective one of a pair of outwardly facing first and second indentations that function as means for engaging the locking ring in order to spread the locking ring by operation of the person squeezing the first and second handles toward each other;

each of the first and second tips defining a respective one of a pair of inwardly facing third and fourth indentations that function as means for engaging the annular rim portion of the sink flange; and each of the first and second elongated members including a respective one of a pair of first and second ring-dislodging components that function as means for enabling the person to dislodge the locking ring from the first and second tips in order to complete installation of the locking ring in the annular groove.

* * * * *